United States Patent
Wang et al.

(10) Patent No.: US 8,859,951 B2
(45) Date of Patent: Oct. 14, 2014

(54) METHOD AND APPARATUS FOR PHOTOSENSOR GAIN AND SCINTILLATION CRYSTAL OPTICAL COUPLING MONITORING IN RADIATION DETECTORS

(71) Applicants: Gin Chung Wang, Grayslake, IL (US); Huini Du, Vernon Hills, IL (US); Jerry Wang, Lake Zurich, IL (US)

(72) Inventors: Gin Chung Wang, Grayslake, IL (US); Huini Du, Vernon Hills, IL (US); Jerry Wang, Lake Zurich, IL (US)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 180 days.

(21) Appl. No.: 13/656,306

(22) Filed: Oct. 19, 2012

(65) Prior Publication Data

US 2014/0110573 A1 Apr. 24, 2014

(51) Int. Cl.
*G01D 18/00* (2006.01)
*G01T 1/40* (2006.01)
*G01T 1/208* (2006.01)
*H04N 1/407* (2006.01)

(52) U.S. Cl.
CPC *H04N 1/407* (2013.01); *G01T 1/40* (2013.01); *G01T 1/208* (2013.01)
USPC ..................................................... 250/252.1

(58) Field of Classification Search
CPC ....................................................... G01T 1/164
USPC ..................................................... 250/252.1
See application file for complete search history.

(56) References Cited

U.S. PATENT DOCUMENTS

| | | | | |
|---|---|---|---|---|
| 5,715,049 A * | 2/1998 | Ohsuka et al. | ................ | 356/215 |
| 5,789,868 A * | 8/1998 | Sears | ............................ | 315/149 |
| 8,324,580 B1 * | 12/2012 | Gagnon et al. | ........... | 250/363.09 |
| 8,604,414 B2 * | 12/2013 | Rauer et al. | ................ | 250/252.1 |
| 2004/0139132 A1 * | 7/2004 | Lutkenhaus et al. | .......... | 708/250 |
| 2012/0305783 A1 * | 12/2012 | Gagnon et al. | ................ | 250/366 |

* cited by examiner

*Primary Examiner* — Kiho Kim
(74) *Attorney, Agent, or Firm* — Oblon, Spivak, McClelland, Maier & Neustadt, L.L.P.

(57) ABSTRACT

A photosensor gain detection apparatus that includes a detector including a photosensor configured to output a signal. Also included in the apparatus is an after-pulse/dark-pulse detector device that detects an after-pulse or a dark-pulse in the signal output by the photosensor, and outputs an indication signal when the after-pulse or the dark-pulse is detected, the after-pulse and the dark-pulse representing after-events in the photosensor triggered from a previous photon generating event. The apparatus additionally includes an integrator device that integrates the signal output by the photosensor and to output an integrated signal, a histogram device connected to the integrator and the after-pulse/dark-pulse detector device, and that generates a histogram from the integrated signal and the indication signal, a gain determination device that determines a gain of the photosensor based on the generated histogram, and a memory configured to store the determined gain.

20 Claims, 6 Drawing Sheets

METHOD AND APPARATUS FOR PHOTOSENSOR GAIN AND SCINTILLATION CRYSTAL OPTICAL COUPLING MONITORING IN RADIATION DETECTORS

CROSS-REFERENCE TO RELATED APPLICATIONS

This application is related to the application Ser. No. 13/656,329, entitled "Determining Relative timing offset in different electronic pathways using internal signals", the contents of which are incorporated herein by reference.

FIELD

The embodiments described herein relate generally to an apparatus and a method of improving photosensor gain calibration in a PET system.

BACKGROUND

In PET imaging, or positron emission tomography, a radiopharmaceutical agent is administered, via injection, inhalation and/or ingestion, to a patient. The physical and bio-molecular properties of the agent then concentrate at specific locations in the human body. The actual spatial distribution, intensity of the point and/or region of accumulation, as well as the kinetics of the process from administration and capture to eventual elimination, all have clinical significance. During this process, the positron emitter attached to the radiopharmaceutical agent emits positrons according to the physical properties of the isotope, such as half-life, branching ratio, etc. Each positron interacts with an electron of the object, is annihilated and produces two gamma rays at 511 keV (electron-positron annihilation event), which travel at substantially 180 degrees apart. The two gamma rays then cause a scintillation event at a scintillation crystal of the PET detector, which detects the gamma rays thereby. By detecting these two gamma rays, and drawing a line between their locations or "line-of-response," the likely location of the original annihilation is determined. While this process only identifies one line of possible interaction, accumulating a large number of these lines, and through a tomographic reconstruction process, the original distribution is estimated with useful accuracy.

Each PET detector may also include, in addition to the scintillation crystal, a photomultiplier tube (PMT) or a silicon photomultiplier (SiPM) that is optically coupled to the scintillator. Each PMT/SiPM has a property denoted as "photosensor gain". In the context of a PMT this gain is defined as the total number of electrons that are collected at the anode of the PMT as a result of an event.

In order to ensure proper operation of the PET system, the photosensor gain for each PMT/SiPM must be consistently re-measured and addressed due the drifting nature of the photosensor gain. This calibration process is typically performed by measuring photo-current induced by an external light source that is different from the scintillator. This process is difficult when the PMT/SiPM is assembled as a part of the detector, and especially when direct measurement of the photosensor gain is unfeasible.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present embodiments.

BRIEF DESCRIPTION OF THE DRAWINGS

A more complete appreciation of the disclosed embodiments and many of the attendant advantages thereof will be readily obtained as the same becomes better understood by reference to the following detailed description when considered in connection with the accompanying drawings, wherein.

DETAILED DESCRIPTION

Figure 1:
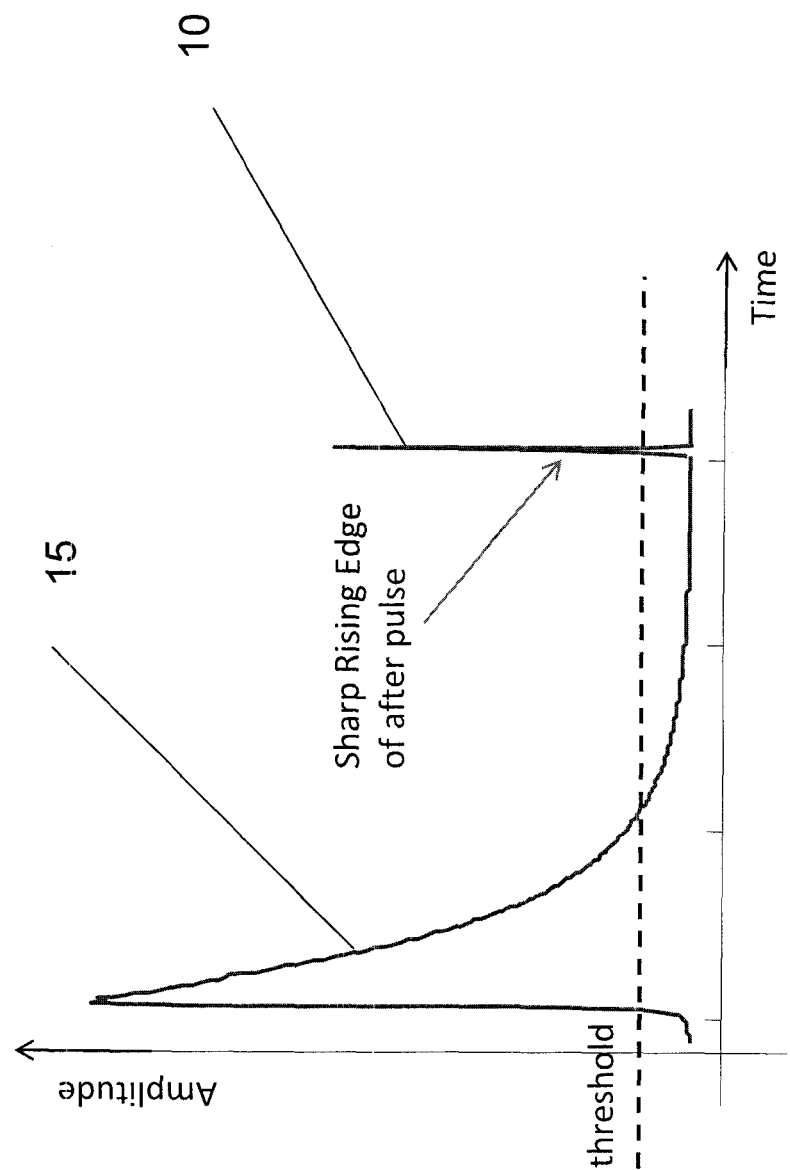
FIG. 1 illustrates an example of an after-pulse according to one embodiment.

In one embodiment, there is described a photosensor gain detection apparatus that includes a detector including a photosensor configured to output a signal. Also included in the apparatus is an after-pulse/dark-pulse detector device that detects an after-pulse or a dark-pulse in the signal output by the photosensor, and outputs an indication signal when the after-pulse or the dark-pulse is detected, the after-pulse and the dark-pulse after-events in the photosensor triggered from a previous photon generating event. The apparatus additionally includes an integrator device that integrates the signal output by the photosensor and that outputs an integrated signal, a histogram device connected to the integrator and the after-pulse/dark-pulse detector device, and that generates a histogram from the integrated signal and the indication signal, a gain determination device that determines a gain of the photosensor based on the generated histogram, and a memory configured to store the determined gain.

In another embodiment, the photosensor is a photomultiplier tube (PMT) or a silicon photomultiplier (SiPM).

In another embodiment, the previous photon generating event is an electron-positron annihilation event.

In another embodiment, the memory further stores a reference gain for the photosensor.

In another embodiment, the memory further stores an identification of the photosensor corresponding to the determined gain.

In another embodiment, the apparatus further includes a processing unit that receives the determined gain and the reference gain and to determine whether the photosensor is unrecoverable and whether a calibration process should be performed based on a comparison of the determined gain and the reference gain.

In another embodiment, the processing unit further performs the calibration process in response to the determination that the calibration process should be performed.

In another embodiment, the processing unit further issued an alert identifying the photosensor in response to the determination that the photosensor is unrecoverable.

In another embodiment, the after-pulse/dark-pulse detector circuit includes an integrating device configured to filter out signals other than the after-pulse or the dark-pulse.

In another embodiment, the after-pulse/dark-pulse detector circuit does not to detect the after-pulse or the dark-pulse when the filtered integrated signal is greater than 100 keV.

Further, in another embodiment, there is described a method of photosensor gain detection. The method includes the steps of outputting a signal detected by a detector including a photosensor, detecting an after-pulse or a dark-pulse in the signal output by the photosensor using an after-pulse/dark-pulse detector device, and outputting an indication signal when the after-pulse or the dark-pulse is detected, the after-pulse and the dark-pulse representing after-events in the photosensor triggered from a previous photon generating event, integrating, using an integrator device, the signal output by the photosensor and outputting an integrated signal, generating, using a histogram device connected to the integrator device and the after-pulse/dark-pulse detector device, a histogram from the integrated signal and the indication signal, determining a gain of the photosensor based on the generated histogram, and storing the determined gain in a memory.

Referring now to the drawings wherein like reference numbers designate identical or corresponding parts throughout the several views, FIG. 1 shows an analog output signal from a photosensor, which could be a photomultiplier tube (PMT) or a silicon photomultiplier (SiPM). Information about the gain of a particular photosensor is determinable from after-pulses such as after-pulse 10 shown in FIG. 1.

After-pulses are a type of noise that is often observed in photosensors. The after-pulses are an after-event in the photosensor triggered from a previous event. In addition, signals produced by this after-event are spontaneous without the need to add an external light source. As is shown in FIG. 1, these pulses 10 follow the main signal pulse 15 after a delay period. One mechanism that causes after-pulses is the emission of light from the latter stages of the PMT that finds its way back into the photosensor. These types of after-pulses follow shortly after the main pulse 15. In addition, these types of after-pulses not only have a sharp leading edge, but also have high amplitude resulting in a small integrated value.

The small integrated value provides a signature that enables the after-pulses to be isolated by filtering out other signals.

Another type of after-pulse is a dark-pulse. A dark-pulse may be caused by imperfections in the PMTS or from reactions in SiPMs. For example, with regard to PMTS, small amounts of residual gas may be ionized by the passage of electrons through the PMT. The positive ions that are formed move in the reverse direction and some return back to the photo detector. The dark-pulses may show up well after the after-pulses because the velocity of the positive ions is relatively low. Further, the beta decay from a Lutetium (Lu) background of a LYSO ($Lu_{1.8}Y_{0.2}SiO_5(Ce)$) crystal can also trigger an after-pulse from a PMT.

These two types of pulses (after-pulses and dark-pulses) are generated from the photosensor internally and may be used to measure the photosensor gain, thus simplifying the calibration process. Since signals corresponding to these two types of pulses are proportional to the gain of the photosensor itself, and not related to the coupling material or the scintillator, measuring these signal amplitudes is equivalent to measuring the photosensor gain, given that the signal processing electronics before integration are functioning properly.

Figure 2:
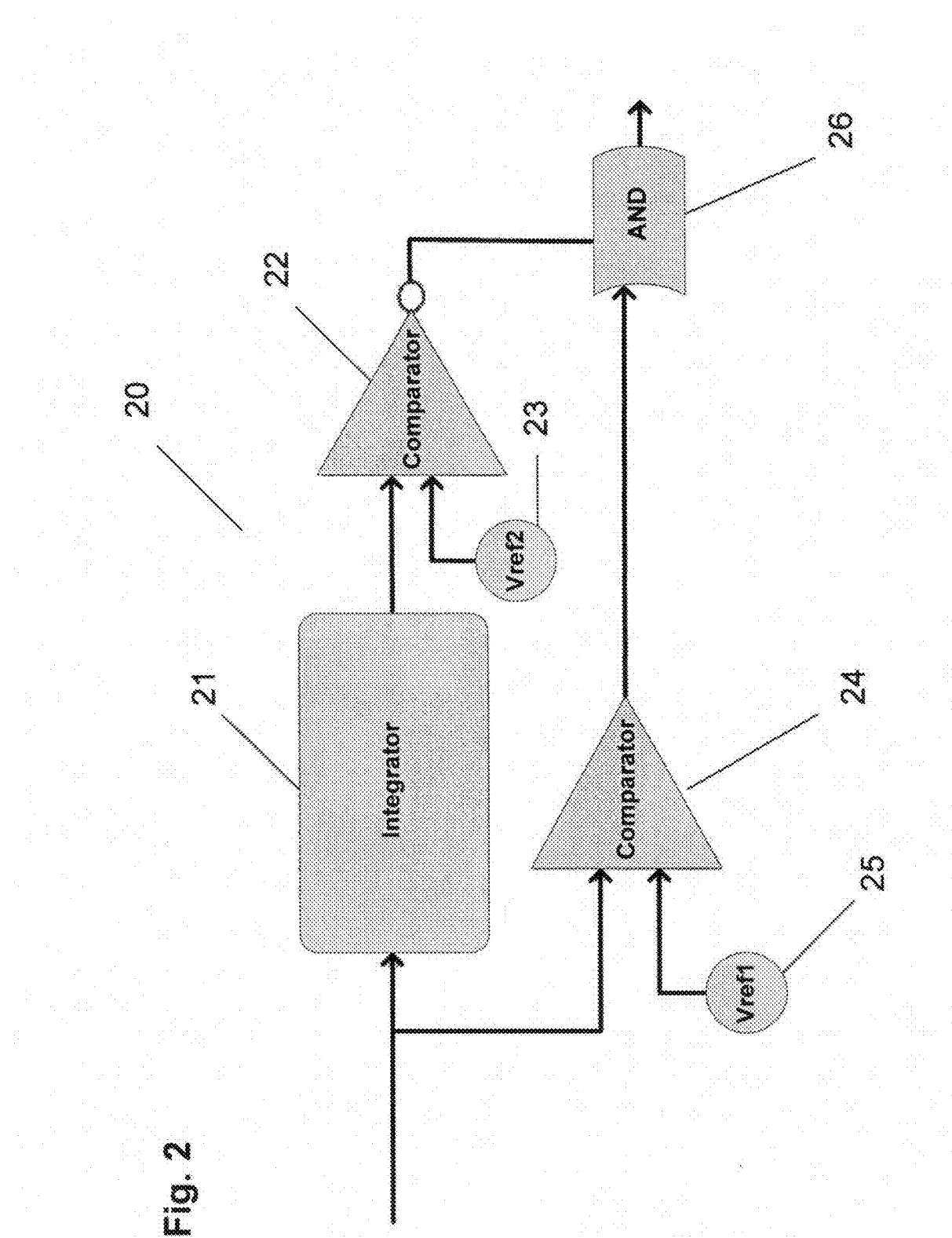
FIG. 2 illustrates an exemplary after-pulse detector circuit.

FIG. 2 illustrates an example of an after-pulse detector. Each photosensor is connected to an after-pulse detector such that the photosensor may be evaluated. This detector may also be used to detect dark-pulses.

This detector is used to detect the presence of an after-pulse and to output an indication when the after-pulse has been detected. In addition, this detector facilitates a determination regarding whether the after-pulse or dark-pulse has a gain that is above or below a predetermined threshold, which indicates that the photosensor is functioning properly, is recoverable, or is un-repairable.

In an alternate embodiment, the after-pulse detector is triggered by the detection of an annihilation event by a different event detector that is designed to detect the event that precedes the after-pulse. As a result of such a trigger, the after-pulse detector is able to avoid processing the signals resulting from the main event. The after-pulse detector could then be turned off after the after-pulse has been detected.

In an additional alternate embodiment, the after-pulse detector is implemented by a combination of software and hardware. In particular, the after-pulse detector obtains the analog signal by way of an analog-to-digital (A/D) converter that samples the signal output from the photosensor. The sampled digital signal is then processed using integration and filtering to determine whether an after-pulse is present in the signal. The digital implementation of the after-pulse detector also keeps track of the timing of each signal so that signals may be compared for timing differences.

The after-pulse detector device 20 shown in FIG. 2 includes an integrator 21 that receives the input signal and produces a time domain integration value. The after-pulse signals have a small time domain integration value compared to the main signal generated from the main event utilizing ionization radiation. Thus, the output from the integrator 21 is input into a comparator 22, which filters out the events that have an integration value that is greater than or equal to a value Vref2 23. For example, Vref2 23 could be set to be a value higher than an integrated signal equivalent of 100 keV (a predetermined threshold associated with an after-pulse). It should be noted that the value of Vref2 23 may be calibrated to better match the particular photosensor from which an after-pulse is being detected.

In addition to filtering out signals which have an integration footprint greater than an after-pulse, the detector also filters out all signals that have an amplitude that is not above a certain threshold. For example, the comparator 24 is set to compare the input signal with Vref1 25, which is set to be above the noise floor but lower than the average amplitude of the after-pulses.

The output of the comparators 22 and 24 are input to AND gate 26. If both signals are high, a signal is output indicating that an after-pulse has been detected.

Figure 3:
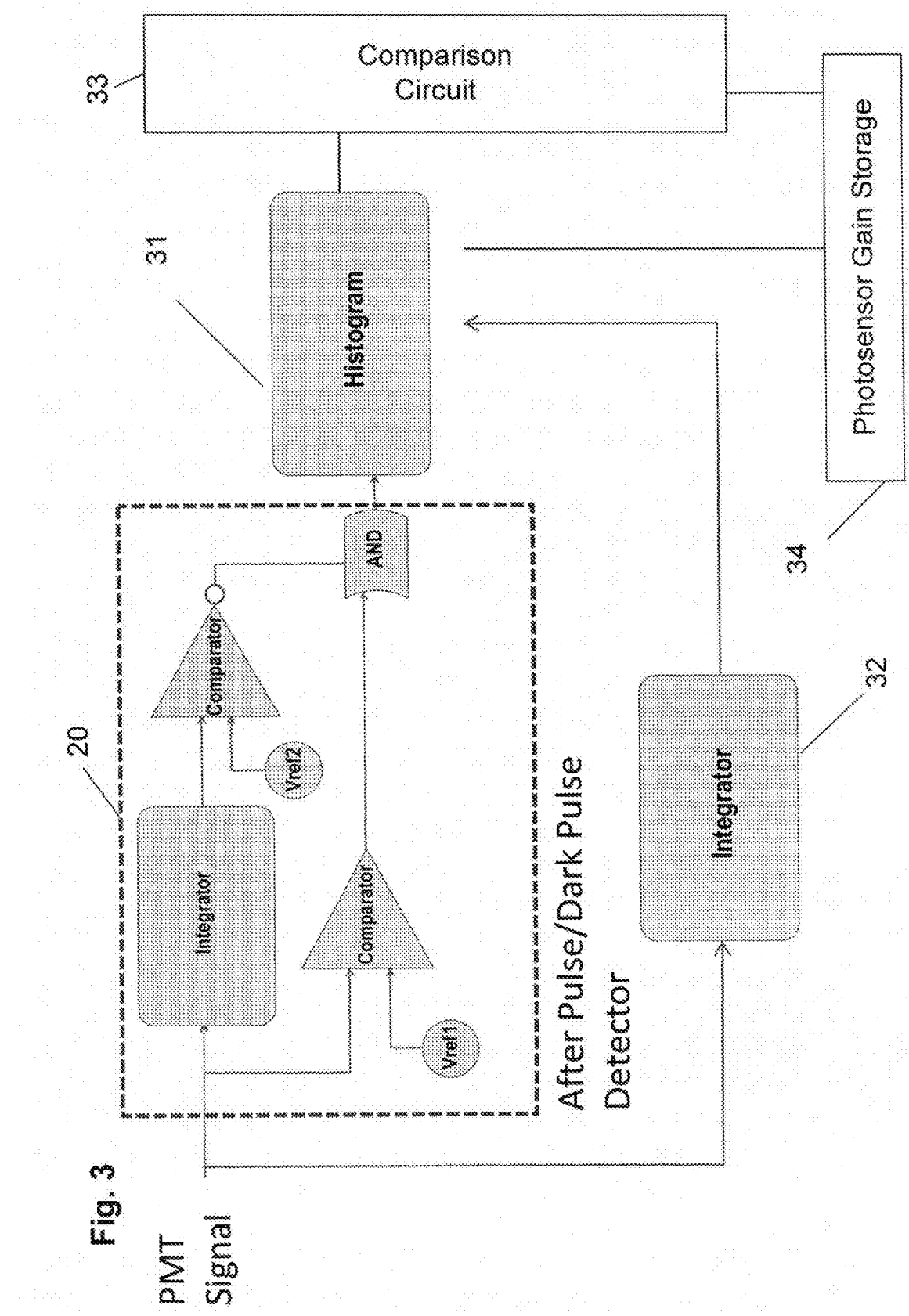
FIG. 3 illustrates a system configuration according to one embodiment.

FIG. 3 shows an exemplary structure of the photosensor gain evaluation circuit. The after-pulse/dark-pulse detector 20 shown in FIG. 2 is connected to a histogram circuit 31, which is also connected to an integrator circuit 32.

Each of the after-pulse/dark-pulse detectors 20, the histogram circuit 31, and the integrator circuit 32 may be alternatively implemented by a combination of software and hardware. In addition, the integrator circuit 32 may use a common circuit with the integrator 21 to implement the features thereof.

Figure 4:
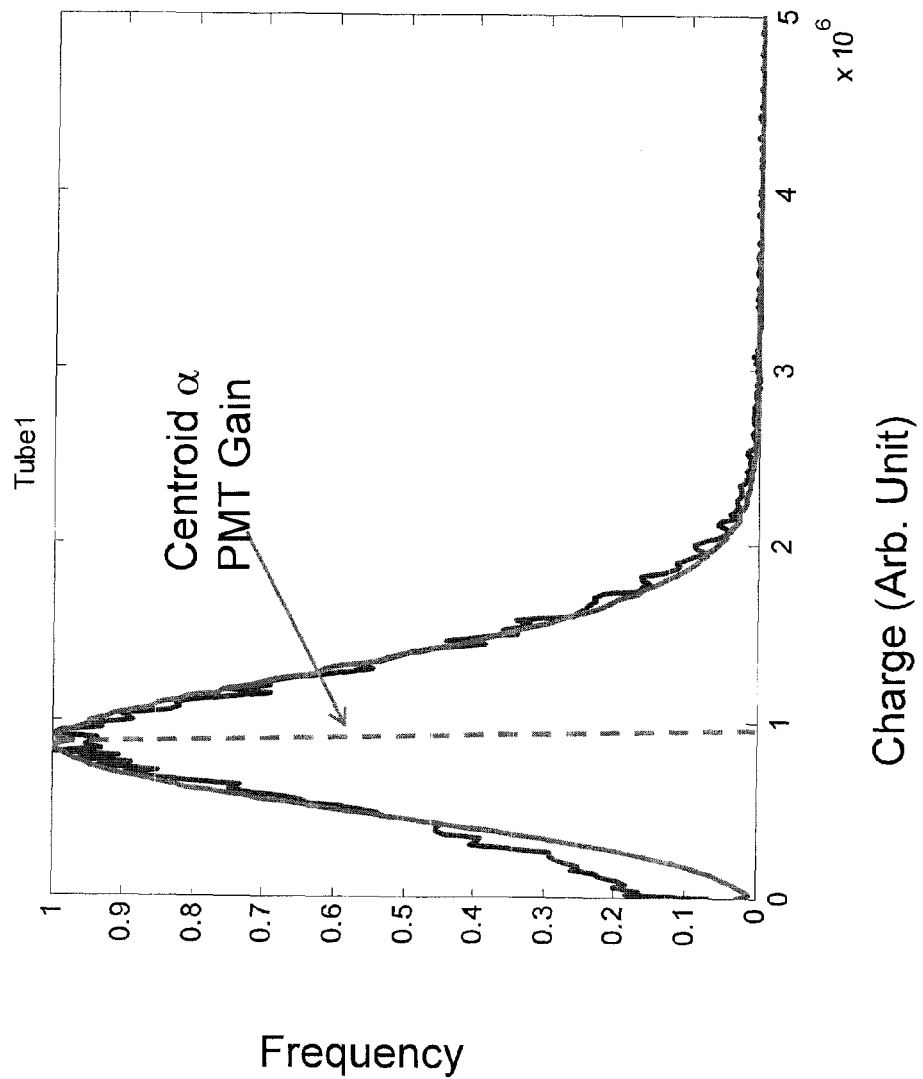
FIG. 4 illustrates a distribution and a representation of the position of the photosensor gain.

The histogram circuit 31 inputs multiple events from the integrator 32 and a corresponding indication from the after-pulse/dark-pulse detector 20 that indicates whether the event was an after-pulse or a dark-pulse. The histogram circuit 31 produces a histogram that illustrates a distribution of values. An example of this distribution is shown in FIG. 4. The signal value at the center of the distribution is proportional to the photosensor gain. In particular, the values in the histogram are a representation of the current produced by the photosensor, which is proportional to the photosensor gain.

Thus, the comparison circuit 33 uses the distribution to determine whether the maximum amplitude of the photosensor signal is greater than some predetermined threshold that indicates the recoverability of the photosensor.

As is shown in FIG. 4, the center of the histogrammed integrated value of the photosensor signal triggered from the after-pulse/dark-pulse detector (by carefully setting Vref1 and Vref2) well represents the photosensor gain. In FIG. 4, the y axis represents frequency/counts and the X axis represents an arbitrary unit for the integrated area such as "Charge/Volt-sec".

As is noted above, the detector is able to determine whether the after-pulse or dark-pulse has a gain that is above a predetermined threshold, which indicates that the photosensor is functioning properly, is recoverable, or is un-repairable. A photosensor such as a PMT is unrecoverable if its gain has degraded to half of its original value. Thus, the comparison circuit 33 is able to determine whether the photosensor gain is greater than, for example, half of a stored value.

The photosensor gain storage 34 continuously stores the photosensor gain determined for a particular photosensor. Alternately, the photosensor gain storage 34 could store only a normalized highest photosensor gain value for a particular photosensor (original value). This information is used by the comparison circuit 33 to determine the state of the photosensor.

There are at least two ways to determine if the photosensor is functioning properly, is recoverable, or is un-repairable. For example, the industrial standard, which is discussed above, can be used. For instance, if the photosensor gain is degraded to half of the photosensor's original gain then the photosensor is identified as having malfunctioned. Alternatively, if the absolute gain of the photosensor is below a certain value (for example, produces only values below a threshold floor), the photosensor is identified as having malfunctioned. An algorithm or circuit is used to monitor the values which are filtered by the after-pulse/dark-pulse determine if the photosensor is only producing values below the threshold floor.

The photosensor gain may also be used to determine if a problem exists with the optical coupling between the scintillator and photosensor. For example, when a degradation in light output is detected, it can be first determined whether or not the gain of the photosensor has degraded. If not, then the problem may be isolated to the optical coupling, which may lead to the replacement of the whole detector.

Figure 5:
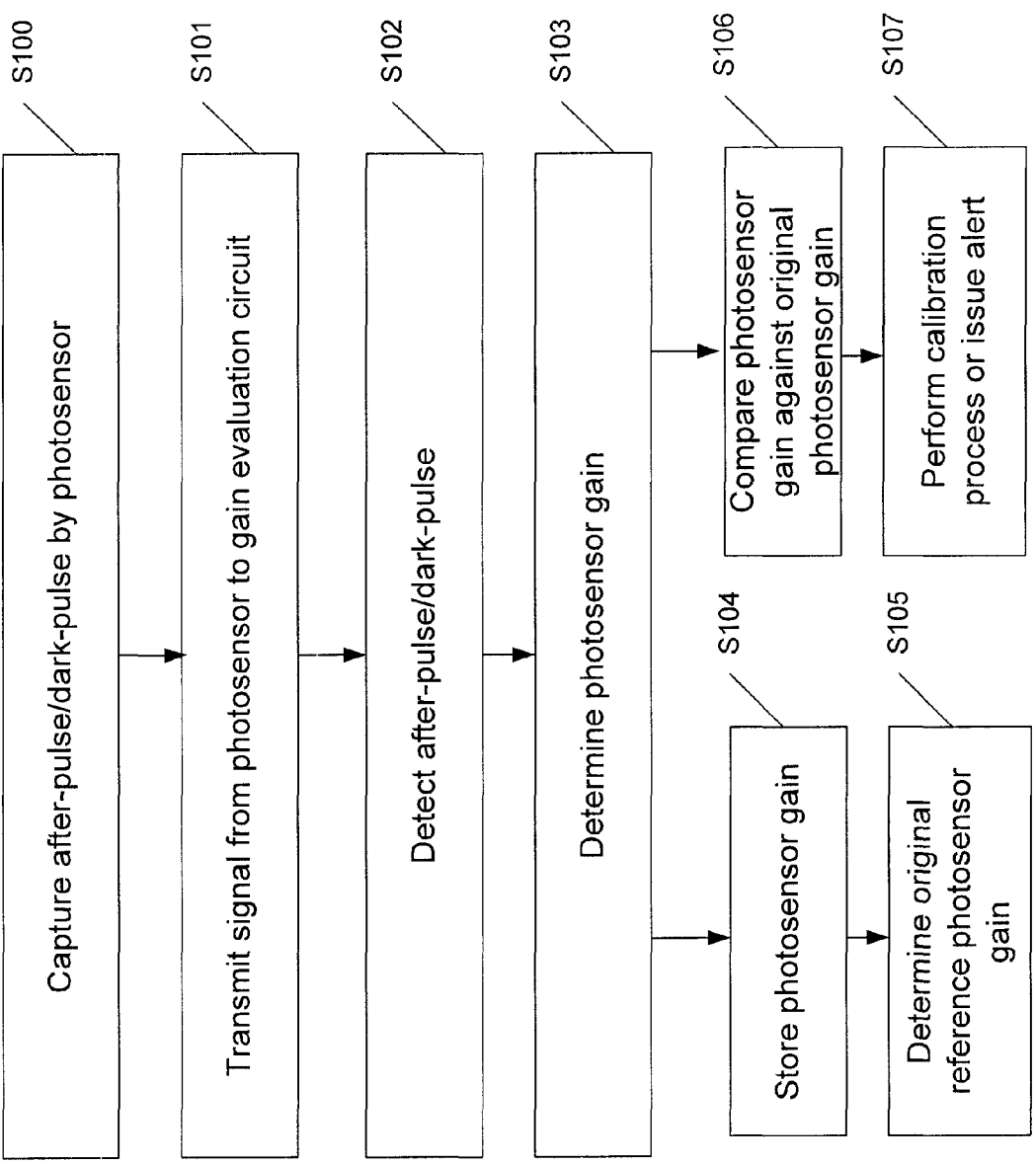
FIG. 5 illustrates a process flow diagram according to one embodiment.
Figure 6:
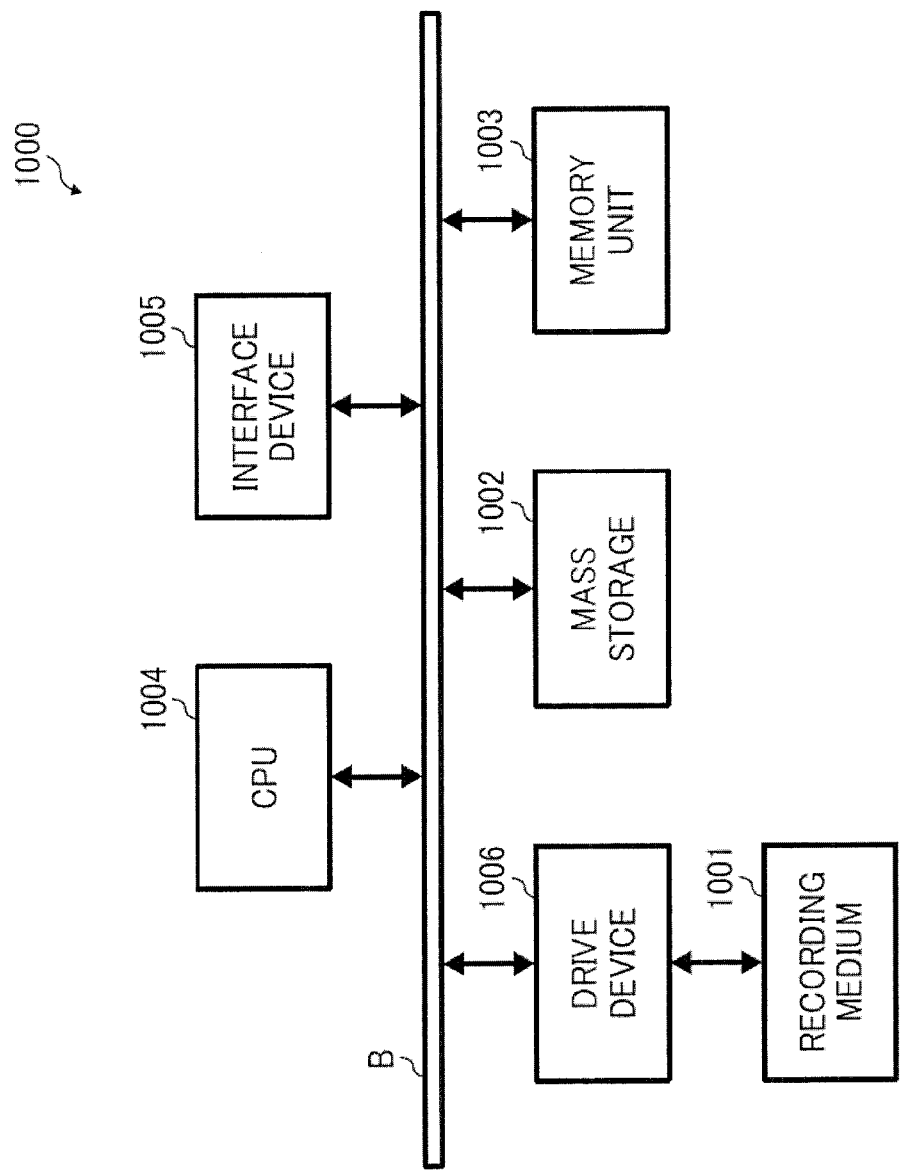
FIG. 6 illustrates an exemplary computer system according to one embodiment.

FIG. 5 illustrates a flow diagram of the process of detecting after-pulses and comparing this trigger against the histogrammed integrated value of the photosensor generated signal.

In step S100, an after-pulse or a dark-pulse is captured by a photosensor. The after-pulse is detected shortly after the main event is detected. The dark-pulse is detected later than the after-pulse.

In step S101, a signal is transmitted from the photosensor to the photosensor gain evaluation circuit where the signal is split and directed to the after-pulse/dark-pulse detector and to the integrator 32.

In step S102, the after-pulse/dark-pulse detector determines whether or not an after-pulse or dark-pulse is detected.

In step S103, in response to an after-pulse/dark-pulse being detected, a detection signal is output to the histogram circuit, which applies the detection signal as detection time and the integrated signal received from the integrator 32 to generate a histogram, which represents events that occur in the signal.

Using the generated histogram, the system estimates the centroid and arrives at a value which correlates to the photosensor gain signal. (See, for example, FIG. 4).

In step S104, the obtained photosensor gain signal is recorded in storage.

In step S105, the stored photosensor gain signal is used along with a predetermined number of previously stored photosensor gain signals to determine the original photosensor gain. This step may alternatively be performed before the detection process as a pre-step.

In step S106, the photosensor gain determined in step S104 is compared against the stored original photosensor gain to determine whether the current photosensor gain is too low or if the system is able to be calibrated to correct for the current photosensor gain variance.

In step S107, the calibration process regarding the front end amplification is performed based on the photosensor gain determined in step S103. Alternatively, when the gain is less than a predetermined threshold, an alert is issued identifying the photosensor that has failed and is unrecoverable. If the photosensor is unrecoverable, this photosensor is marked for replacement.

Certain portions of the processing may be implemented using some form of computer processor. As one of ordinary skill in the art would recognize, the computer processor can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog or any other hardware description language and the code may be stored in an electronic memory directly within the FPGA or CPLD, or as a separate electronic memory. Further, the electronic memory may be non-volatile, such as ROM, EPROM, EEPROM or FLASH memory. The electronic memory may also be volatile, such as static or dynamic RAM, and a processor, such as a microcontroller or microprocessor, may be provided to manage the electronic memory as well as the interaction between the FPGA or CPLD and the electronic memory.

Alternatively, the computer processor may execute a computer program including a set of computer-readable instructions that perform the functions described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OSX and other operating systems known to those skilled in the art.

In addition, certain features of the embodiments can be implemented using a computer based system 1000 shown in FIG. 7. The computer 1000 includes a bus B or other communication mechanism for communicating information, and a processor/CPU 1004 coupled with the bus B for processing the information. The computer 1000 also includes a main memory/memory unit 1003, such as a random access memory (RAM) or other dynamic storage device (e.g., dynamic RAM (DRAM), static RAM (SRAM), and synchronous DRAM (SDRAM)), coupled to the bus B for storing information and instructions to be executed by processor/CPU 1004. In addition, the memory unit 1003 may be used for storing temporary variables or other intermediate information during the execution of instructions by the CPU 1004. The computer 1000 may also further include a read only memory (ROM) or other static storage device (e.g., programmable ROM (PROM), erasable PROM (EPROM), and electrically erasable PROM (EEPROM)) coupled to the bus B for storing static information and instructions for the CPU 1004.

The computer 1000 may also include a disk controller coupled to the bus B to control one or more storage devices for storing information and instructions, such as mass storage 1002, and drive device 1006 (e.g., floppy disk drive, read-only compact disc drive, read/write compact disc drive, compact disc jukebox, tape drive, and removable magneto-optical drive). The storage devices may be added to the computer 1000 using an appropriate device interface (e.g., small computer system interface (SCSI), integrated device electronics (IDE), enhanced-IDE (E-IDE), direct memory access (DMA), or ultra-DMA).

The computer 1000 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer 1000 may also include a display controller coupled to the bus B to control a display, such as a cathode ray tube (CRT), for displaying information to a computer user. The computer system includes input devices, such as a keyboard and a pointing device, for interacting with a computer user and providing information to the processor. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer 1000 performs at least a portion of the processing steps of the embodiments in response to the CPU 1004 executing one or more sequences of one or more instructions contained in a memory, such as the memory unit 1003. Such instructions may be read into the memory unit from another computer readable medium, such as the mass storage 1002 or a removable media 1001. One or more processors in a multi-processing arrangement may also be employed to execute the sequences of instructions contained in memory unit 1003. In alternative embodiments, hard-wired circuitry may be used in place of or in combination with software instructions. Thus, embodiments are not limited to any specific combination of hardware circuitry and software.

As stated above, the computer 1000 includes at least one computer readable medium 1001 or memory for holding instructions programmed according to the teachings of the embodiments and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read.

Stored on any one or on a combination of computer readable media, the present embodiments include software for controlling the main processing unit 1004, for driving a device or devices for implementing the embodiments, and for enabling the main processing unit 1004 to interact with a human user. Such software may include, but is not limited to, device drivers, operating systems, development tools, and applications software. Such computer readable media further includes the computer program product of the present embodiments for performing all or a portion (if processing is distributed) of the processing performed in implementing the embodiments.

The computer code elements on the medium of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any medium that participates in providing instructions to the CPU 1004 for execution. A computer readable medium may take many forms, including but not limited to, non-volatile media, and volatile media. Non-volatile media includes, for example, optical, magnetic disks, and magneto-optical disks, such as the mass storage 1002 or the removable media 1001. Volatile media includes dynamic memory, such as the memory unit 1003.

Various forms of computer readable media may be involved in carrying out one or more sequences of one or more instructions to the CPU 1004 for execution. For example, the instructions may initially be carried on a magnetic disk of a remote computer. An input coupled to the bus B can receive the data and place the data on the bus B. The bus B carries the data to the memory unit 1003, from which the CPU 1004 retrieves and executes the instructions. The instructions received by the memory unit 1003 may optionally be stored on mass storage 1002 either before or after execution by the CPU 1004.

The computer 1000 also includes a communication interface 1005 coupled to the bus B. The communication interface 1004 provides a two-way data communication coupling to a network that is connected to, for example, a local area network (LAN), or to another communications network such as the Internet. For example, the communication interface 1005 may be a network interface card to attach to any packet switched LAN. As another example, the communication interface 1005 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1005 sends and receives electrical, electromagnetic or optical signals that carry digital data streams representing various types of information.

The network typically provides data communication through one or more networks to other data devices. For example, the network may provide a connection to another computer through a local network (e.g., a LAN) or through equipment operated by a service provider, which provides communication services through a communications network. The local network and the communications network use, for example, electrical, electromagnetic, or optical signals that carry digital data streams, and the associated physical layer (e.g., CAT 5 cable, coaxial cable, optical fiber, etc). Moreover, the network may provide a connection to a mobile device such as a personal digital assistant (PDA) laptop computer, or cellular telephone.

While certain embodiments have been described, these embodiments have been presented by way of example only, and are not intended to limit the scope of the embodiments. Indeed the novel methods and systems described herein may be embodied in a variety of other forms; furthermore, various omissions, substitutions, and changes in the form of the methods and systems described herein may be made without departing from the spirit of the embodiments. The accompanying claims and their equivalents are intended to cover such forms or modifications as would fall within the scope and spirit of the embodiments.

The invention claimed is:

1. A photosensor gain detection apparatus, comprising:
a detector including a photosensor configured to output a signal;
an after-pulse/dark-pulse detector device configured to detect an after-pulse or a dark-pulse in the signal output by the photosensor, and to output an indication signal when the after-pulse or the dark-pulse is detected, the after-pulse and the dark-pulse representing after-events in the photosensor triggered from a previous photon generating event;
an integrator device configured to integrate the signal output by the photosensor and to output an integrated signal;
a histogram device connected to the integrator and the after-pulse/dark-pulse detector device, and configured to generate a histogram from the integrated signal and the indication signal;
a gain determination device configured to determine a gain of the photosensor based on the generated histogram; and
a memory configured to store the determined gain.

2. The photosensor gain detection apparatus according to claim 1, wherein the memory is further configured to store a reference gain for the photosensor.

3. The photosensor gain detection apparatus according to claim 2, further comprising:
a processing unit configured to receive the determined gain and the reference gain and to determine whether the photosensor is unrecoverable, and whether a calibration process should be performed based on a comparison of the determined gain and the reference gain.

4. The photosensor gain detection apparatus according to claim 3, wherein the processing unit is further configured to perform the calibration process in response to the determination that the calibration process should be performed.

5. The photosensor gain detection apparatus according to claim 3, wherein the processing unit is further configured to issue an alert identifying the photosensor in response to the determination that the photosensor is unrecoverable.

6. The photosensor gain detection apparatus according to claim 1, wherein the memory is further configured to store an identification of the photosensor corresponding to the determined gain.

7. The photosensor gain detection apparatus according to claim 1, wherein the after-pulse/dark-pulse detector circuit includes an integrating device configured to filter out signals other than the after-pulse or the dark-pulse.

8. The photosensor gain detection apparatus according to claim 7, wherein the after-pulse/dark-pulse detector circuit is configured not to detect the after-pulse or the dark-pulse when the filtered integrated signal is greater than 100 keV.

9. The photosensor gain detection apparatus according to claim 1, wherein the photosensor is a photomultiplier tube (PMT) or a silicon photomultiplier (SiPM).

10. The photosensor gain detection apparatus according to claim 1, wherein the previous photon generating event is an electron-positron annihilation event.

11. A photosensor gain detection method, comprising:
outputting a signal detected by a detector including a photosensor;
detecting an after-pulse or a dark-pulse in the signal output by the photosensor using an after-pulse/dark-pulse detector device, and outputting an indication signal when the after-pulse or the dark-pulse is detected, the after-pulse and the dark-pulse representing after-events in the photosensor triggered from a previous photon generating event;
integrating, using an integrator device, the signal output by the photosensor and outputting an integrated signal;
generating, using a histogram device connected to the integrator device and the after-pulse/dark-pulse detector device, a histogram from the integrated signal and the indication signal;
determining a gain of the photosensor based on the generated histogram; and
storing the determined gain in a memory.

12. The photosensor gain detection method according to claim 11, wherein the storing further comprises storing a reference gain for the photosensor.

13. The photosensor gain detection apparatus according to claim 12, further comprising:
receiving the determined gain and the reference gain and determining, using a processing circuit, whether the photosensor is unrecoverable, and whether a calibration process should be performed based on a comparison of the determined gain and the reference gain.

14. The photosensor gain detection method according to claim 13, further comprising:
performing the calibration process in response to the determination that the calibration process should be performed.

15. The photosensor gain detection method according to claim 13, further comprising:
issuing an alert identifying the photosensor in response to the determination that the photosensor is unrecoverable.

16. The photosensor gain detection method according to claim 11, wherein the storing further comprises storing an identification of the photosensor corresponding to the determined gain.

17. The photosensor gain detection method according to claim 11,
wherein the detecting step further comprises filtering out signals other than the after-pulse or the dark-pulse.

18. The photosensor gain detection method according to claim 17, wherein the detecting step comprises not detecting the after-pulse or the dark-pulse when the filtered integrated signal is greater than 100 keV.

19. The photosensor gain detection method according to claim 11, wherein the photosensor is a photomultiplier tube (PMT) or a silicon photomultiplier (SiPM).

20. The photosensor gain detection method according to claim 11, wherein the previous photon generating event is an electron-positron annihilation event.

* * * * *